No. 631,019. Patented Aug. 15, 1899.
A. LEVEDAHL.
ROLLER BEARING.
(Application filed Dec. 27, 1898.)
(No Model.) 2 Sheets—Sheet 2.
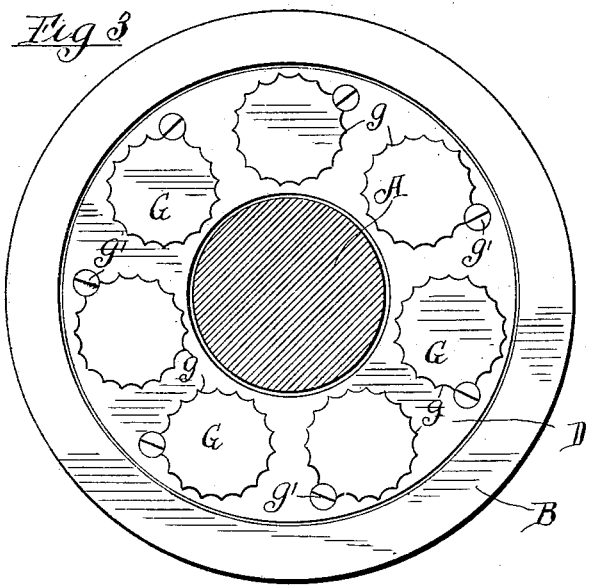
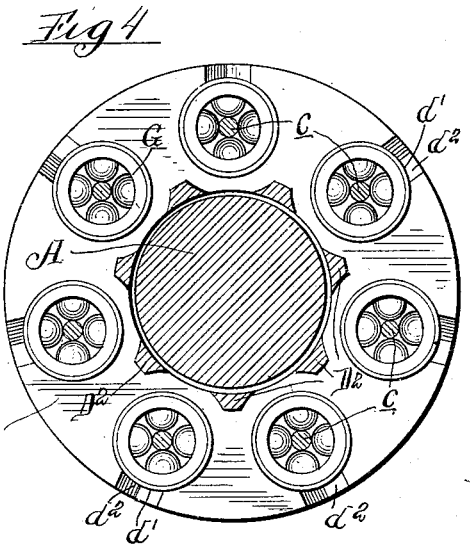
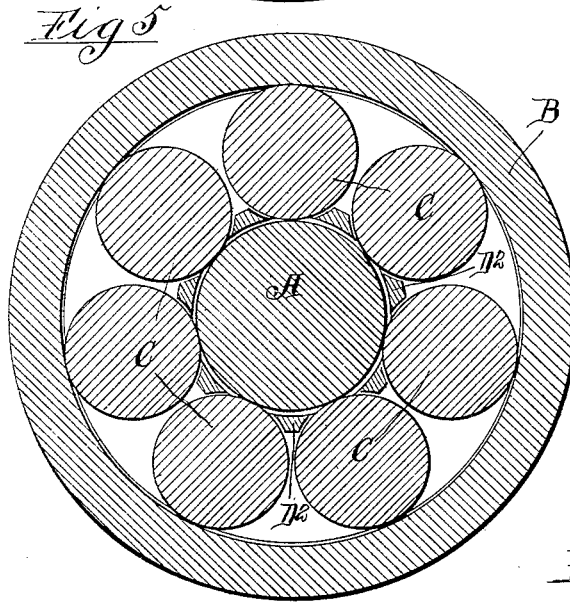
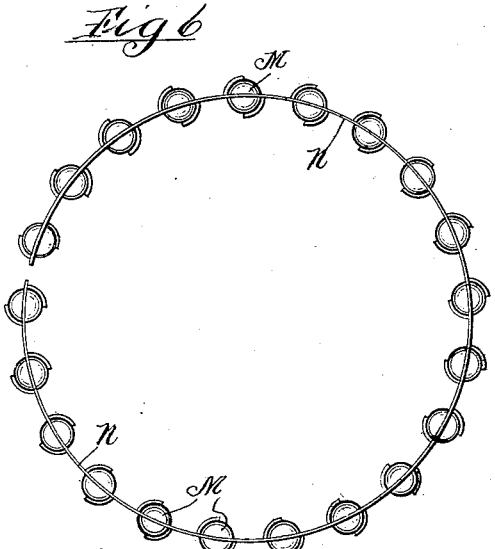
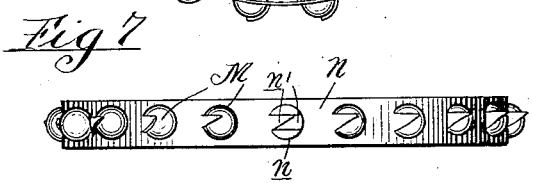
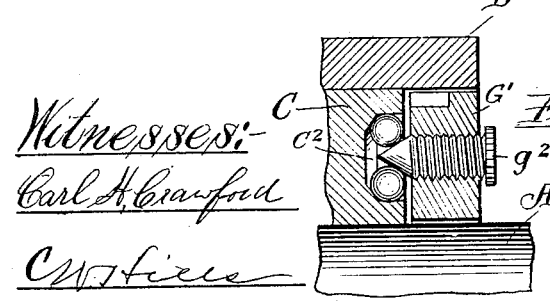
Witnesses:
Carl H. Crawford
Inventor:
Axel Levedahl
by Pooler Brown his Attys

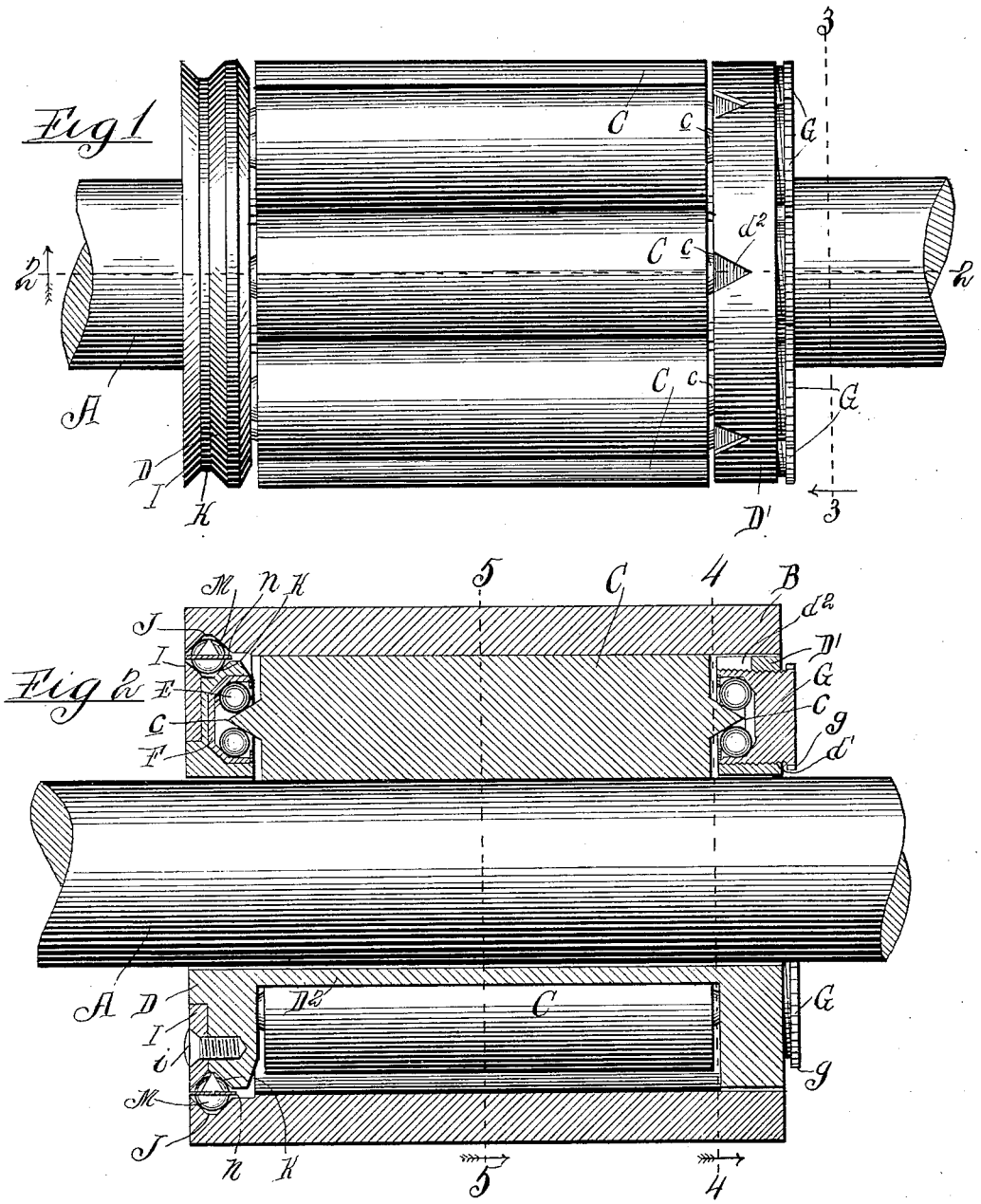

# UNITED STATES PATENT OFFICE.

AXEL LEVEDAHL, OF AURORA, ILLINOIS, ASSIGNOR TO THE AURORA AUTOMATIC MACHINERY COMPANY, OF SAME PLACE.

ROLLER-BEARING.

SPECIFICATION forming part of Letters Patent No. 631,019, dated August 15, 1899.

Application filed December 27, 1898. Serial No. 700,299. (No model.)

*To all whom it may concern:*

Be it known that I, AXEL LEVEDAHL, of Aurora, in the county of Kane and State of Illinois, have invented certain new and useful Improvements in Roller-Bearings; and I do hereby declare that the following is a full, clear, and exact description thereof, reference being had to the accompanying drawings, and to the letters of reference marked thereon, which form a part of this specification.

This invention relates to an improved construction in roller-bearings adapted for shafts, journals, and the like of that class embracing, in connection with the shaft-journal or other cylindric rotative part, an exterior part or housing having an annular bearing-surface surrounding the same, a plurality of cylindric rollers interposed between the shaft or journal and said annular bearing-surface, and a rotative cage consisting of two connected heads or ends in which the ends of said rollers are journaled, which is carried by said rollers and by which the said rollers are held constantly in parallel relation during their bodily motion around the bearing-surface.

The invention consists in the matters hereinafter described, and pointed out in the appended claims.

In the accompanying drawings, which illustrate my invention, Figure 1 is a view in plan elevation of a bearing embodying my invention. Fig. 2 is a longitudinal section on line 2 2 of Fig. 1. Fig. 3 is a section on line 3 3 of Fig. 1. Fig. 4 is a cross-section of the cage, taken on line 4 4 of Fig. 2. Fig. 5 is a cross-section on line 5 5 of Fig. 2. Fig. 6 is a side elevation of the caging-ring containing the balls. Fig. 7 is a plan view of said caging-ring. Fig. 8 illustrates a modification of the adjustable roller-bearing.

As shown in said drawings, A indicates a cylindric shaft or journal, and B a stationary casing or housing which surrounds the said shaft or journal and is provided with a cylindric interior bearing-surface.

C C indicate the antifriction-rollers which are interposed between the shaft or journal A and the inner bearing-surface of the housing B. The said rollers are engaged at their ends with a cage consisting of two rings or heads D D' and a plurality of connecting-bars $D^2 D^2$. The central openings of the heads D D' are somewhat larger in diameter than the shaft, so that they are free from contact therewith, and the external diameter of the heads is somewhat less than the interior diameter of the housing B, in which said heads are inserted.

The ends of the rollers C are engaged with the heads D D' by means of antifriction-roller bearings made as follows: The head D is provided in its inner face with a plurality of circular recesses forming the annular external bearing-surfaces or ball-races, and the adjacent ends of the rollers have journal projections $c$, having conical outwardly-tapering bearing-surfaces which enter said recesses, and between which and the external bearing-surfaces are located bearing-balls E E. In order to provide suitably-hardened bearing-surfaces for the balls, the surfaces of the recesses are formed by means of separate linings or cups F, which may be secured in the recesses by being forced therein under pressure. The head D' is provided with a plurality of screw-threaded apertures $d'$, in which are located screw-plugs G G, having formed in their inner ends bearing-recesses like those in the head D. The ends of the rollers adjacent to said plugs are provided with journal projections $c$, having outwardly-tapering conical bearing-surfaces, between which and the bearing-surfaces of the recesses in the plugs are located bearing-balls. The plugs G, having screw-threaded connection with the head D', as described, may be moved endwise in said head by turning them therein to afford accurate adjustment of the bearings at both ends of the rollers.

In order to provide means for securely fastening or holding the plugs from rotation when adjusted, the said plugs are made long enough to extend outside of the head D' and are provided on their outer ends with notched flanges $g$, with which are engaged screw-studs $g'$, of which there is one for each plug inserted in the outer surface of the head. By removing the screw-stud belonging to either plug the same may be turned to a desired extent and when properly adjusted the screw-stud will be inserted to hold the plug from further movement.

The heads D D' and connecting-bars D² of the cage are preferably made integral with each other or cut from one piece of metal; but, if desired, the heads may be made separate from and secured to said bars. When the parts constituting the cage are integral with each other, it is necessary to provide means for removing the rollers from and inserting them in said cage. The means herein shown for this purpose consist of notches $d^2$ in the inner surface of the head D', said notches extending into the apertures which receive the plugs G and operating in connection with said plugs. When the plugs are in their usual or normal positions, they extend over or cover the said notches $d^2$; but said plugs may be withdrawn so far as to uncover the notches and permit the outward movement of the bearing projections on the adjacent ends of the rollers outwardly past their inner edges, it being obvious that the rollers may be easily released by first freeing their ends from the head D'.

In order to hold from endwise movement the rollers and cage, a ball-bearing adapted to prevent any endwise movement of the cage with respect to the housing B is provided between said cage and housing, as follows: In the inner face of the housing, opposite the edge of the head D, is formed an angular groove J, forming a ball-race, said groove having two angular or conical faces arranged at equal angles with respect to the axis of the bearing. In the edge of the said head D, opposite the groove J, is a similar angular groove K, having two angular or conical surfaces which also are at equal angles with the central axis of the bearing. Said groove is formed partly on the head itself and partly on a separate adjustable ring I, which is attached to the outer face of the head D. Said ring is shown as secured to the head by screws $l$. In the opposite grooves J and K are located balls M. The ring I is made removable in order to admit of the insertion and removal of the balls, and when adjustment is necessary to take up loss by wear the ring may be reduced in thickness by grinding or otherwise to give the desired adjustment of the bearing-surfaces with relation to each other.

In Figs. 2, 6, and 7 is illustrated a caging-ring for the balls which form the bearing by which the cage is held from endwise movement in the exterior housing. Such caging-ring, as indicated by N in the drawings, has the form of a cylindric band or hoop, which may be continuous or may be severed at one point, as in the instance shown in the drawings, in which latter case it may be easily formed by bending into circular form a straight strip of sheet metal. Said ring is provided with a plurality of circular or nearly-circular openings $n$, each of which is adapted to receive one of the bearing-balls M. At opposite sides of said openings are arranged integral pointed tongues or prongs $n'$, which are bent or deflected outwardly from the ring, those belonging to each opening being extended at opposite sides thereof, so as to engage the inner and outer surfaces of the balls, as clearly seen in Fig. 7. The holding-prongs referred to are arranged along the central line of the ring, so that while having proper holding engagement with the balls they will not strike or come in contact with the sides of the ball-grooves in the housing-head D or of the cage-head. The said holding-prongs $n'$ will be conveniently formed by cutting or punching the ring, as seen in Fig. 6, to give proper form to said prongs and by bending the prongs oppositely and preferably into curved form to correspond generally with the curvature of the balls which are held between them.

A caging-ring constructed as described obviously serves to hold the balls at uniform distances apart and at some distance from each other, thereby enabling the bearing to be constructed with a less number of balls than would be necessary in the absence of such a caging-ring. A caging-ring having openings and prongs as described has in itself important advantages and may be used in connection with ball-bearings of any kind where such a ring is applicable. It is therefore herein claimed as a separate improvement.

As a modification of the bearing for the rollers the cone may be an adjustable plug and the complemental cups in the end of the rollers as shown in Fig. 8, wherein the plug G' is shown provided with a cone $g^2$ of the ball-bearing and the end of the roller is provided with the complemental cup $c^2$.

I claim as my invention—

1. A roller-bearing comprising an exterior case or housing provided with an interior cylindric surface, a shaft or journal within the same, rollers between said parts, a cage for the rollers, and a ball-bearing for each end of each roller consisting of annular bearing members, one of which has a conical bearing-surface, and balls interposed between said bearing members, one of the bearing members at one end of each roller being adjustable in the cage-head longitudinally with respect to the roller to provide adjustment of said ball-bearings.

2. A roller-bearing comprising an exterior case or housing provided with an interior cylindric surface, a shaft or journal therein, rollers between said parts, a cage for the rollers, and a ball-bearing for each end of each roller consisting of annular bearing members, one of which has a conical bearing-surface, and balls interposed between said bearing members, the bearing members on one end of each roller being adjustable in the case-head longitudinally with respect to the roller to provide adjustment of said roller-bearings and said adjustable bearing member having the form of a plug passing through and having screw-threaded engagement with the head which supports it.

3. A roller-bearing comprising an exterior housing or casing having an interior cylindric surface, a shaft or journal within the same, rollers interposed between said parts, a cage having heads to engage the opposite ends of the rollers, and a ball-bearing at each end of each roller comprising a conical projection on the roller, a bearing-cup in the head and interposed balls, the bearing-cup at one end of each roller being formed in a plug which is adjustably secured in the head.

4. A roller-bearing comprising an exterior housing or casing having an interior cylindric surface, a shaft or journal within the same, rollers interposed between said parts, a caging having heads to engage the opposite ends of the rollers, and a ball-bearing for each end of each roller comprising a conical projection on the roller, a bearing-cup in the heads and interposed balls; the bearing-cup at one end of each roller being formed in a plug which is adjustable in the head, and said head being provided with a peripheral notch through which the cone on the roller may be passed for removing the roller from the cage.

5. A roller-bearing comprising an exterior housing or casing having an interior cylindric surface, a shaft or journal within the same, rollers interposed between said parts, a cage having heads to engage the opposite ends of the rollers, and a ball-bearing for each end of each roller comprising a conical projection on the roller, a bearing-cup in the head and interposed balls; the bearing-cup at one end of each roller being formed by means of a plug which is adjustable in the head, said plug passing through the head and having screw-threaded engagement therewith, and means for holding the plug from movement when adjustable, consisting of a notched flange on the plug and a movable holding-stud or the like adapted to engage one of the notches in said flange.

6. The combination of an exterior case or housing having a cylindric interior surface, a shaft or journal within the same, interposed rollers, a cage having heads affording bearings for the ends of the rollers, and means for holding the cage from endwise movement in the housing embracing opposite angular grooves on one head of the cage and the housing, and bearing-balls inserted in said grooves.

7. The combination of an exterior case or housing having a cylindric interior surface, a shaft or journal within the same, interposed rollers, a cage having heads affording bearings for the ends of the rollers, means for holding the cage from endwise movement in the housing embracing opposite angular grooves on one head of the cage and the housing, and bearing-balls inserted in said grooves, the cage-head containing said bearing-groove having a separable ring which forms the outer wall of the groove.

8. A roller-bearing comprising an exterior housing or casing, a shaft or journal within the same, rollers interposed between said parts, a cage having heads to engage opposite ends of the rollers and ball-bearings at the ends of the rollers each comprising a cone and cup with balls interposed between, one of said parts being secured on a head and acting to hold the rollers parallel with respect to the shaft.

In testimony that I claim the foregoing as my invention I affix my signature, in presence of two witnesses, this 17th day of December, A. D. 1898.

AXEL LEVEDAHL.

Witnesses:
TAYLOR E. BROWN,
R. CUTHBERT VIVIAN.